(12) United States Patent
Zhang et al.

(10) Patent No.: US 11,923,744 B2
(45) Date of Patent: Mar. 5, 2024

(54) BRUSHLESS DIRECT DRIVE LINEAR SERVO ACTUATOR

(71) Applicant: FUGNA MECHATRONICS CO., LTD., Suzhou (CN)

(72) Inventors: Haifeng Zhang, Suzhou (CN); Chengjiong Ying, Suzhou (CN)

(73) Assignee: FUGNA MECHATRONICS CO., LTD., Jiangsu (CN)

( * ) Notice: Subject to any disclaimer, the term of this patent is extended or adjusted under 35 U.S.C. 154(b) by 113 days.

(21) Appl. No.: 17/622,090

(22) PCT Filed: Jun. 25, 2020

(86) PCT No.: PCT/CN2020/098300
§ 371 (c)(1),
(2) Date: Dec. 22, 2021

(87) PCT Pub. No.: WO2020/259639
PCT Pub. Date: Dec. 30, 2020

(65) Prior Publication Data
US 2022/0368209 A1    Nov. 17, 2022

(30) Foreign Application Priority Data
Jun. 25, 2019 (CN) .......................... 201910551808.1

(51) Int. Cl.
*H02K 41/03* (2006.01)
*H02K 11/21* (2016.01)

(52) U.S. Cl.
CPC ........... *H02K 41/031* (2013.01); *H02K 11/21* (2016.01)

(58) Field of Classification Search
CPC ...... H02K 41/031; H02K 33/16; H02K 35/02; H02K 11/21; H02K 1/141; H02K 1/143
(Continued)

(56) References Cited

U.S. PATENT DOCUMENTS

| 4,195,277 A | 3/1980 | Leicht |
| 6,215,206 B1 * | 4/2001 | Chitayat ............. A61M 1/3403 310/90 |

(Continued)

FOREIGN PATENT DOCUMENTS

| CN | 101451520 | 7/2010 |
| CN | 101431285 | 12/2011 |

(Continued)

OTHER PUBLICATIONS

Machine translation of JP-2002112518-A. (Year: 2002).*

(Continued)

*Primary Examiner* — Michael Andrews
(74) *Attorney, Agent, or Firm* — Workman Nydegger

(57) ABSTRACT

The present disclosure provides a brushless direct drive linear servo actuator, comprising: a stator, a mover and a housing, wherein the stator is a pair of armatures arranged in mirror symmetry at both sides of the mover, the housing integrally encapsulates the stator and forms a cavity for the mover at the mover, and the mover has an output end protruding out of the housing and is linearly movable along a direction of the output end. A displacement signal emitter is provided at a side of the mover, and a signal receiver is provided within a cover arranged outside the housing on said side for detecting a displacement signal emitted by the emitter of the mover. The actuator of the present disclosure is characterized by high reliability, high accuracy and low cost.

19 Claims, 5 Drawing Sheets

(58) Field of Classification Search
USPC .............. 310/12.18, 12.21, 12.22, 216.022
See application file for complete search history.

(56) References Cited

U.S. PATENT DOCUMENTS

| | | | |
|---|---|---|---|
| 7,323,835 | B2 | 1/2008 | Hazelton et al. |
| 9,322,365 | B2 | 4/2016 | Simons |
| 9,614,413 | B2 | 4/2017 | Bucker et al. |
| 2007/0188277 | A1* | 8/2007 | Ries ................. H02K 1/28 |
| | | | 335/78 |
| 2012/0227269 | A1* | 9/2012 | Subramanian ......... H02K 33/06 |
| | | | 30/210 |
| 2014/0023531 | A1 | 1/2014 | Ishii et al. |

FOREIGN PATENT DOCUMENTS

| | | |
|---|---|---|
| CN | 203822497 | 9/2014 |
| CN | 104377843 | 5/2017 |
| CN | 210246580 | 4/2020 |
| EP | 2084808 A1 | 8/2009 |
| EP | 2559900 A1 | 2/2013 |
| JP | 2002112518 A * | 4/2002 |
| JP | 3454062 B2 | 10/2003 |
| JP | 2003-343446 | 12/2003 |
| JP | 2006-166607 | 6/2006 |
| JP | 3820860 | 9/2006 |
| JP | 2007-037279 | 2/2007 |
| WO | 2008/046849 A1 | 4/2008 |
| WO | 2013/028131 A1 | 2/2013 |

OTHER PUBLICATIONS

International Search Report and Written Opinion for PCT/CN2020/098300 dated Sep. 4, 2020.

European Search Report received for EP Patent Application No. 20832332.9, dated Jun. 20, 2023, 8 pages.

* cited by examiner

BRUSHLESS DIRECT DRIVE LINEAR SERVO ACTUATOR

CROSS-REFERENCE TO RELATED APPLICATIONS

The present application is a US 371 Nationalization of International Application No. PCT/CN2020/098300, filed on Jun. 25, 2020, which claims the benefit of and priority to Chinese Application No. 201910551808.1, filed Jun. 25, 2019. The entire content of each of the aforementioned patent applications is incorporated herein by reference.

FIELD OF THE DISCLOSURE

The present disclosure relates to a brushless direct drive linear servo actuator, which belongs to the field of brushless motor, in particular relates to a brushless direct drive linear servo actuator with moving magnet and integral position feedback, of which an armature-composed stator is integrally encapsulated.

BACKGROUND OF THE DISCLOSURE

In the field of intake and exhaust applications of internal combustion engines, the continuous upgrade of emission regulations requires more precise, faster, and more reliable control of fuel consumption and exhaust emission. For example, exhaust gas recirculation valves, electrically regulated turbo-charging technology, etc. are used for these purposes. However, these functions require the use of actuators which are resistant to high temperatures, vibrations and corrosions, and also accurate, robust and reliable for long service life. Meanwhile, such a large-scale manufacturing application field is very sensitive to manufacturing cost. Due to wide use and low cost of rotary motors, linear motion is most preferably transferred from rotary motors via a mechanical conversion device.

In the disclosed patent U.S. Pat. No. 9,322,365B2, in order to regulate the exhaust gas recirculation valve of the engine, two stages of gears amplify a rotary brush motor, and an eccentric cam mechanism converts the rotary motion into linear motion. Such devices can generate sufficient linear thrust with appropriate stroke by using low-power motor at low cost. However, for the demanding application environment of exhaust gas recirculation valve, the above technical solution has several insufficiencies. For example, the mechanical motion conversion mechanism requires high manufacturing accuracy, whether in those gears or the positioning for assembly, the same for cam mechanism. The disclosed patent U.S. Pat. No. 9,614,413B2 aims to further optimize the above solution to solve the relevant problems. Considering the temperature variations during usage, necessary clearance must be designed appropriately between mating components to avoid getting stuck; due to mechanical conversion mechanism amplification, a tiny clearance will be amplified as a position deviation at the output end; after long-time, frequent operations, movable components will be deteriorated and thus the accuracy is lower. Also, the position signal sensor needs to be separately arranged at the output end, where given the surrounding electromagnetic interferences, the structure arrangement is a challenge and it is difficult to ensure the accuracy. Mechanical components are also subjected to high temperatures, load impacts, etc., and thus they are usually the source of failure and greatly reduce the service life and reliability of the system. In consideration of the cost, such types of solutions usually adopt brush motors in which the brush abrasion limits the system service life, and thus such solutions can hardly meet the application requirements of high-level reliability internal combustion engines.

If a brushless motor is applied to the above solution, as recited in the disclosed patent U.S. Pat. No. 7,323,835B2, a screw mechanism is used to convert rotary motion into linear motion. Although the limitation of brush abrasion is eliminated, the electronic controller cost greatly increases for commutation and actuator control. The above patent aims to reduce its electronics cost by optimizing the arrangement of Hall sensors. As for high-temperature application environment like an internal combustion engine, the reliability of electronic components greatly reduces with the increase of temperature; once its temperature grade reaches over 125° C., the cost will significantly increase. In order to ensure the displacement accuracy, an additional position signal sensor is usually arranged at the output end, which increases not only the difficulty of electronic component arrangement, but also the cost. Moreover, this solution still cannot avoid the above-mentioned insufficiencies of mechanical motion conversion mechanism.

Another disclosed patent (Patent Number: CN104377843B) of the present applicant discloses a brushless direct drive rotary torque actuator, where rotary motion may be converted into linear motion by using a cam plate structure (refer to patent CN203822497U). Since this type of brushless direct drive rotary torque actuator has limited rotation angle, it can be controlled in the same manner as brushed motors without any need of electronic commutation. Meanwhile, a rotational position sensor is integrated inside, and it can meet the requirements of applications under high-temperature and requiring high reliability. The controller cost is low. However, it still relies on mechanical motion conversion mechanism. The related problems of accuracy and reliability of the mechanical mechanism still exist. Therefore, it is still not the ideal solution.

Although various professionals have explored in the field of brushless direct drive linear actuator, no solution has been published for the above-mentioned harsh application field. For example, in the early disclosed patent U.S. Pat. No. 4,195,277, the linear motion of a moving magnet structure is achieved by means of arranging a magnet at one side of an armature, wherein the magnet is magnetized perpendicular to the moving direction; or by means of arranging a magnet between a pair of oppositely arranged armatures, wherein the magnet is magnetized perpendicular to the moving direction. Such solutions, however, have low power efficiency and low value for industrial application. Furthermore, the disclosed patent CN101451520B discloses a solution where the stator has a pair of oppositely arranged winding armatures, said armature has multi poles, and a mover structure with at least a pair of magnets is arranged between said armatures. Such solution is used for the compressor application, with alternative current incitation, the mover performs a reciprocating movement to compress the air. However, such structure is complicated, with big size and also high manufacturing cost; it cannot meet the requirements of reliability and long service life for harsh application environments; and it cannot realize position feedback control. Therefore, it cannot meet the above application requirements of high reliability, high accuracy, and low cost.

SUMMARY OF THE DISCLOSURE

The object of this disclosure is to provide a brushless direct drive linear servo actuator with moving magnet and integral position feedback, of which an armature-composed stator is integrally encapsulated. The specific structure is described below.

A brushless direct drive linear servo actuator comprises a stator, a mover and a housing, wherein the stator is a pair of armatures arranged in mirror symmetry at both sides of the mover, the housing integrally encapsulates the stator and forms a cavity at the place of the mover, and the mover has an output end protruding out of the housing and is linearly movable to a direction of the output end.

Further, the mover is slidable along an inner wall of the housing in the cavity for the mover, a position signal emitter is provided at a side of the mover in sliding contact with the housing, a cover is further provided outside the housing on said side, the housing is connected with the cover, a position signal receiver paired with the position signal emitter is provided inside the cover, and both the emitter and the receiver are positioned on a central plane of mirror symmetry of the armatures of the stator.

Further, the housing is connected with the cover in such a way that the housing and the cover are in a snap-fit connection.

Further, a seal groove is further provided at the connection region of the housing and the cover, and a seal is provided in the seal groove.

Further, the mover comprises a frame and magnets arranged within the frame, the output end of the mover is formed by protruding out of the frame, and the frame is slidable relative to the inner wall of the housing.

Further, a bushing is provided between the frame of the mover and a corresponding surface of the inner wall of the housing, wherein the bushing is made of a wear-resistant and load-resistant material.

Further, at least one sliding shaft extends into the cavity for the mover, and the frame of the mover is provided with a shaft hole or groove in the number and position corresponding to the sliding shaft, wherein the shaft hole or groove are in sliding fit with the respective sliding shaft to guide the mover in the cavity for the mover.

Further, the at least one sliding shaft includes a plurality of sliding shafts, more preferably two sliding shafts.

Further, the sliding shaft is fixed to the housing.

Further, under the configuration where two sliding shafts are provided, one shaft hole or groove at a side of the frame of the mover, for example, at a side close to the position signal emitter, is a circular through-hole, which is in precise but clearance fit with the respective sliding shaft, while the other shaft hole or groove is a waist-shaped hole or open waist-shaped hole.

Further, a recess is provided on the frame of the mover, the magnet is positioned in the recess, and the recess region of the frame of the mover is of a soft magnetic material.

Further, a bushing is provided between the output end of the mover and the corresponding surface of the housing.

Further, the armature of the stator comprises a core having at least three stator poles and an insulation enclosing at least one of the stator poles, a wire coil is wound within the insulation, and the wire coils of the pair of armatures are connected end-to-end.

Further, the housing has a mounting opening at a side opposite to the output end of the mover, on which mounting opening a matching cap is provided.

Further, the housing has a mounting opening at the output end of the mover, on which mounting opening a matching cap is provided.

The present disclosure has the following advantageous effects: the stator of the actuator includes a pair of armatures arranged in mirror symmetry relative to the mover, the force applied to the mover at the direction perpendicular to the central plane of mirror symmetry is balanced, and the mover bears only pushing and pulling forces in a moving direction of the mover. Also, different from the typical mechanically assembled structure of armature, mover and housing, where clearances accumulate and add up and thus result in an increased air gap variation between the mover and the stator, the armatures of the stator of the present disclosure are integrally encapsulated by the housing, and thus the cavity for the mover is formed and positioned relative to the stator poles by a mould, with very high position accuracy; therefore, the mover has very little friction within the housing, which greatly reduces sliding abrasion, thereby improving the expected service life and reliability of a sliding system and meanwhile increasing the effective output of the system. When bushings are arranged between the frame of the mover and the corresponding surface of the inner wall of the housing, and between the output end of the mover and the corresponding surface of the housing, and the bushings are made of a wear-resistant and load-resistant material, the load-resistant capacity of the system can be further improved and frictions are reduced.

The stator of the actuator is integrally encapsulated by the housing, and the heat generated by the wire coils of the armatures of the stator can be conducted through the completely covering and integrally encapsulating housing, which significantly enhances the heat dissipating performance, and improves reliability and service life.

Both the emitter and the receiver are arranged on the central plane of mirror symmetry of the stator, and the magnetic field generated here by the armatures of the stator and the magnet of the mover has a magnetic-field component of nearly zero along the central plane of mirror symmetry and perpendicular to the moving direction. When the position signal receiver detects along said magnetic-field component, it is completely free of interferences of the magnetic field of the actuator. Meanwhile, the mover performs a direct drive motion without any mechanical conversion clearances at all, which means that there is no deviation caused by mechanical conversion, thereby enabling a step-less position control at any position. A high accuracy of long-term operation of the actuator is thus guaranteed.

The stator of the actuator is integrally encapsulated by the housing, allowing components to be formed in high accuracy, resulting in a concise and compact structure with a reduced total number of components. The actuator can be manufactured and assembled in a simple and reliable manner. In a limited stroke range, there is no need of a complicated electronic controller. The actuator can be controlled in the same manner as a common brushed actuator. Therefore, the total production and usage cost are very low. The present disclosure is especially suitable for large-scale manufacturing application filed.

LIST OF REFERENCE SIGNS

1: stator; 2: mover; 3: cover; 4: cap; 5: air gap; 6: seal; 10: core; 101: stator pole; 102: stator pole shoe; 11: insulation; 12: wire; 13: housing; 131: cavity for the mover; 132: output hole; 133: grab hook; 134: seal groove; 14: bushing for mover; 15: bushing for output end; 16: plane of mirror symmetry; 21: frame of mover; 22: magnet; 23: output end; 24: emitter; 31: connector; 311: PCB-fixing leg; 312: snap-fit buckle; 32: receiver; 33: PCB plate.

DETAILED DESCRIPTION OF THE DISCLOSURE

Figure 1:
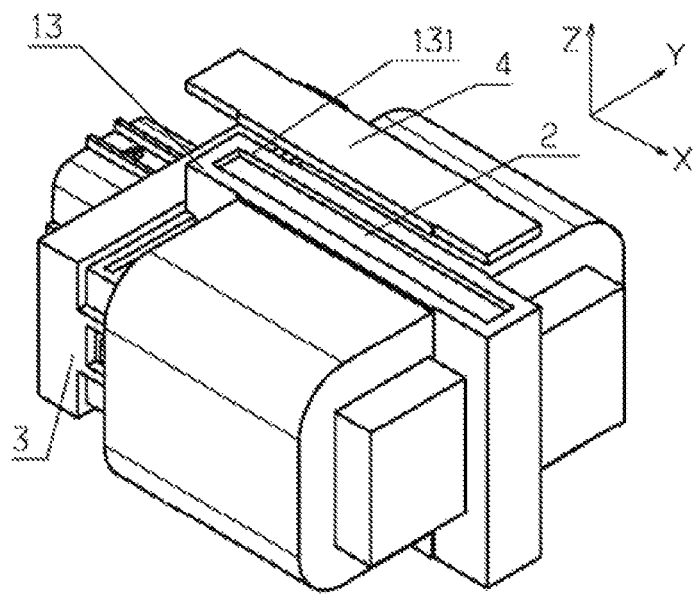
FIG. 1 shows an isometric view of an actuator according to a first embodiment of the present disclosure.

FIG. 1 shows an isometric view of a brushless direct drive linear servo actuator according to a first embodiment of the present disclosure. The specific implementation is as follows: the actuator comprises a stator 1 (not shown), a mover 2, a cover 3, a cap 4, and a housing 13. The stator 1 comprises a pair of armatures and is integrally encapsulated by the housing 13, wherein the housing 13 may be made of plastic or other materials capable of encapsulating and then solidifying, and wherein a cavity 131 for the mover is formed inside the housing 13, the mover 2 is mounted into the cavity 131 for mounting the mover through a mounting opening of the housing 13, and the cavity 131 for the mover is closed by a cap 4. The cavity 131 for the mover retains the mover 2 therein, and ensures that the mover 2 reciprocates along a direction of Z axis within the cavity 131 for the mover. The cover 3 is disposed on one side of the housing 13.

Figure 2:
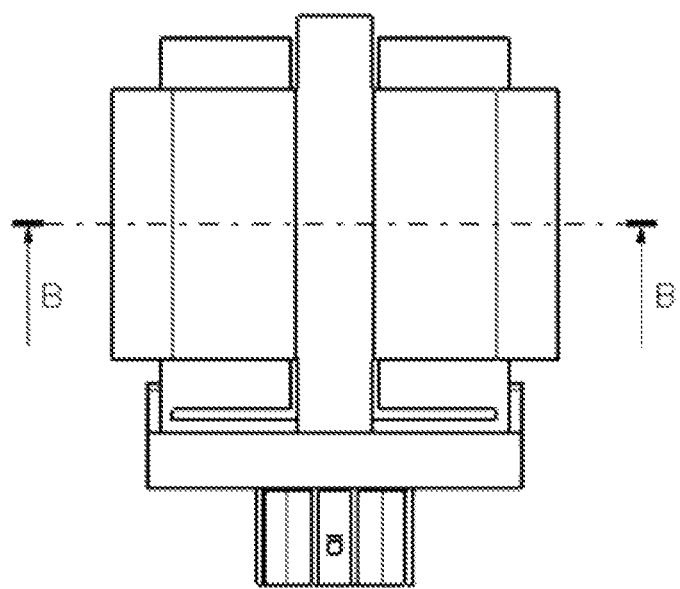
FIG. 2 shows a top view of the actuator according to the first embodiment of the present disclosure.
Figure 3:
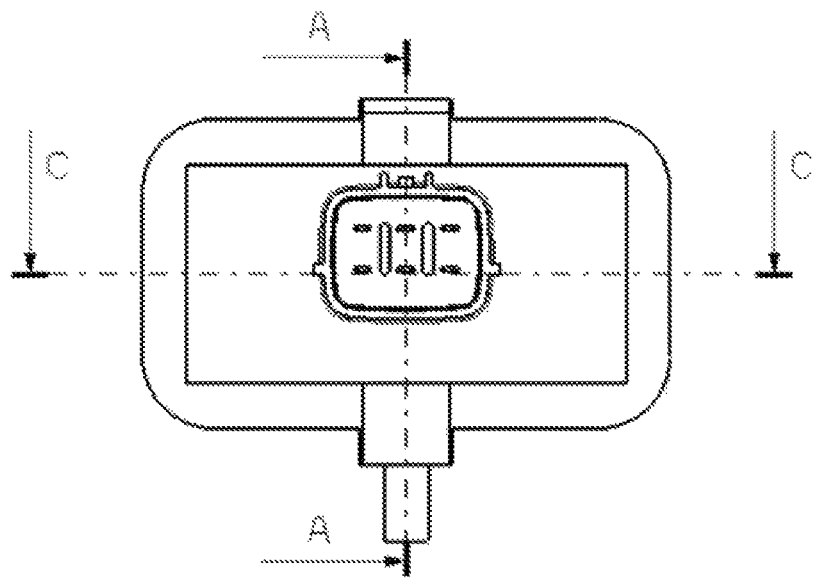
FIG. 3 shows a left view of the actuator according to the first embodiment of the present disclosure.

FIG. 2 shows a top view of the brushless direct drive linear servo actuator according to the first embodiment of the present disclosure, and FIG. 3 shows a left view of the brushless direct drive linear servo actuator according to the first embodiment of the present disclosure.

Figure 4:
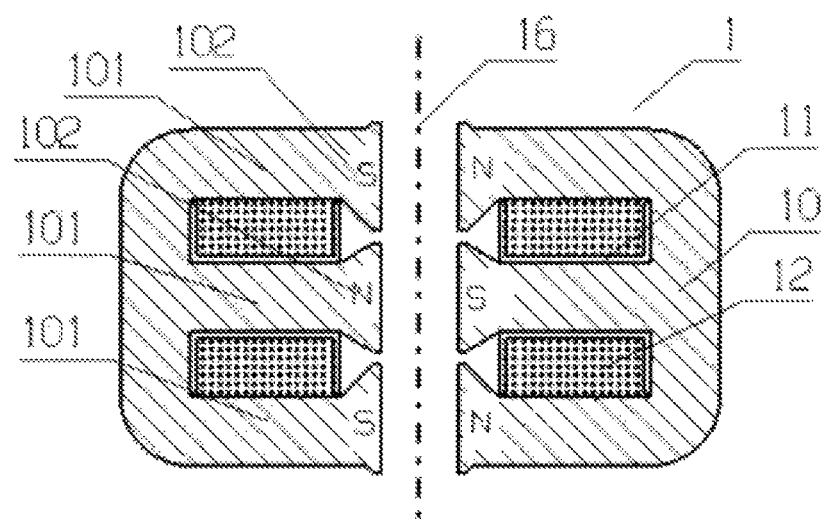
FIG. 4 shows a cross-sectional view of a stator of the actuator, along a plane B-B, according the first embodiment of the present disclosure.

FIG. 4 shows a cross-sectional view of the stator of the brushless direct drive linear servo actuator, along a plane B-B, according to the first embodiment of the present disclosure. The specific implementation is as follows: the stator 1 of the actuator comprises a pair of armatures arranged in mirror symmetry relative to a central plane 16 of mirror symmetry, wherein the armature comprises a core 10, an insulation 11 and a wire 12, the insulation 11 encloses the middle pole of three stator poles 101 of the core 10, and the wire 12 is wound in a winding groove of the insulation 11. The wires 12 of the pair of armatures can be connected end-to-end to form a single phase in such a way that, when electric current flows through the wire 12, the stator poles 101 arranged opposite each other relative to the central plane 16 of mirror symmetry generate excitation magnetic fields having opposite N and S poles. The stator pole shoe 102 is configured to have a chamfer form, and the chamfer form of the middle pole shoe is designed in a different manner from the chamfer form of the two pole shoes aside. Such a chamfer form design not only considers the requirements of magnetic circuit design and guarantees the output performance, but also reduces the weight of the core 10 of the stator to the maximum extent, and provides wires 12 with the maximum winding space to achieve a higher slot filling factor.

Figure 5:
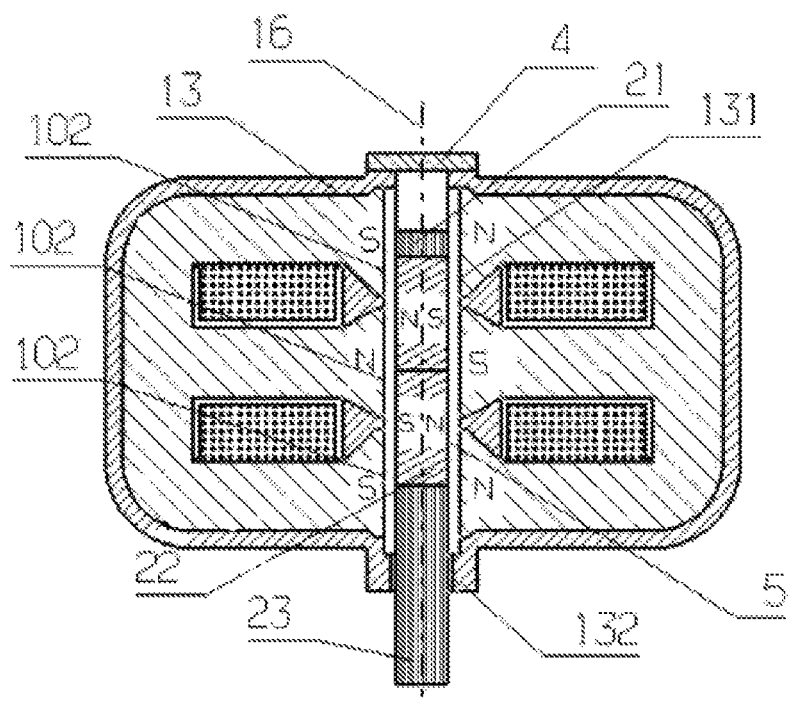
FIG. 5 shows a cross-sectional view of the actuator, along the plane B-B, according to the first embodiment of the present disclosure.

FIG. 5 shows a cross-sectional view of the brushless direct drive linear servo actuator, along the plane B-B, according to the first embodiment of the present disclosure. The specific implementation is as follows: a pair of armatures is integrally encapsulated by the housing 13 to form a solid one-piece structure, wherein the cavity 131 for the mover and an output hole 132 out of which the output end 23 extends are formed inside the housing 13, and both sides of the mover 2 are limited by the cavity 131 for the mover to ensure that the mover 2 is mounted and positioned on the central plane 16 of mirror symmetry of the stator 1 in such a way that an even air gap 5 exists between the mover 2 and the stator pole shoes 102 on each side. The mover 2 comprises a mover frame 21 and a magnet 22, wherein the mover frame 21 protrudes to form the output end 23, and the actuator protrudes out of the output hole 132 to be connected to the driven mechanism. The magnet 22 comprises two pairs of magnetic poles perpendicular to the central plane 16 of mirror symmetry and with their N and S poles arranged in an alternative manner. The cap 4 closes the cavity 131 for the mover after the mover 2 is mounted into the stator 1. In the present embodiment, the cap is arranged at a side opposite to the output end 23, but the cap may also be arranged on a side of the output end 23 in other embodiments.

Figure 6:
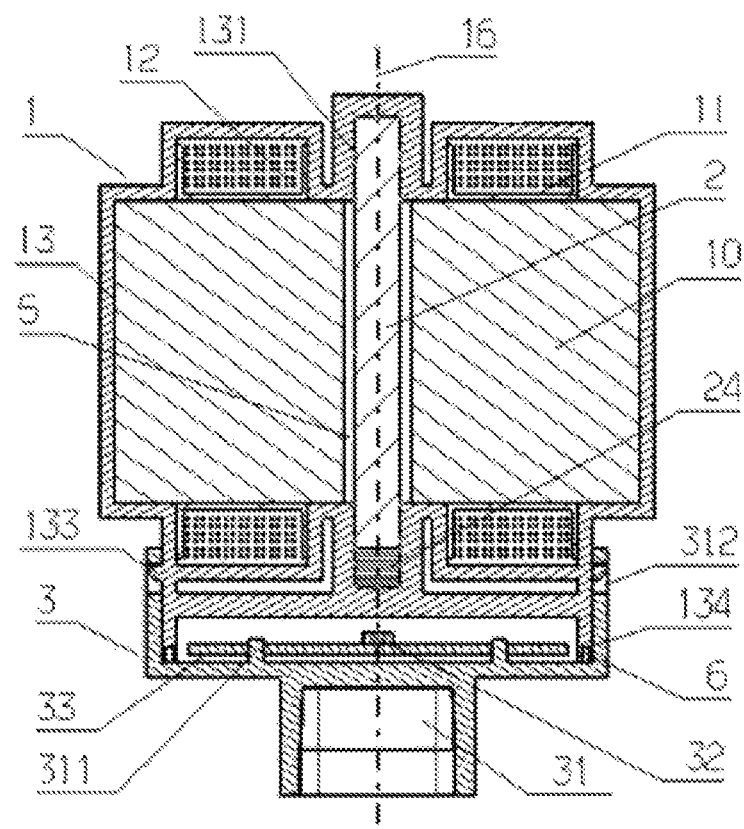
FIG. 6 shows a cross-sectional view of the actuator, along a plane C-C, according to the first embodiment of the present disclosure.

FIG. 6 shows a cross-sectional view of the brushless direct drive linear servo actuator, along a plane C-C, according to the first embodiment of the present disclosure, wherein the stator 1 of the actuator comprises a pair of armatures arranged in mirror symmetry relative to the central plane 16 of mirror symmetry. The armatures comprise the core 10, the insulation 11, and the wire 12. The armatures are integrally encapsulated by the housing 13 to form a solid one-piece structure, and also the cavity 131 for the mover. The mover 2 is limited by the cavity 131 for mounting the mover to ensure that the mover 2 is positioned and mounted on the central plane 16 of mirror symmetry of the stator 1 in such a way that the even air gap 5 exists between the mover 2 and end faces of the stator on each side. One side of the mover 2 is provided with a position signal emitter 24, whose centre is arranged on the central plane 16 of mirror symmetry. The cover 3 is arranged on a side of the housing 13 where the emitter 24 is arranged, and the housing 13 is provided with a cover interface on said side for connecting to the cover. The cover 3 is provided with a PCB plate 33 therein, and the PCB plate 33 is positioned by a PCB-fixing leg 311 on the cover 3. A receiver 32 is provided on the PCB plate 33 with its centre arranged on the central plane 16 of mirror symmetry, and is opposite to the inside emitter 24. When the mover 2 moves relative to the stator 1, the receiver 32 receives a changing signal emitted by the emitter 24 on the mover 2, so as to calculate and output a precise position of the mover 2 relative to the stator 1. A connector 31 is provided at an exterior of the cover 3 for electrical connection to the external. A plurality of grab hooks 133 are provided at a fitting portion of the housing 13 fitting with the cover 3, and a plurality of snap-fit buckles 312 are provided at a fitting portion of the cover 3 fitting with the grab hooks 133 on the housing 13 in order to realize installation and fitting between the housing 13 and the cover 3. A seal groove 134 is also provided at a fitting portion of the housing 13 fitting with the cover 3, and a seal 6, such as a seal ring or glue, is filled into the seal groove 134 to seal an interior of the cover.

Figure 7:
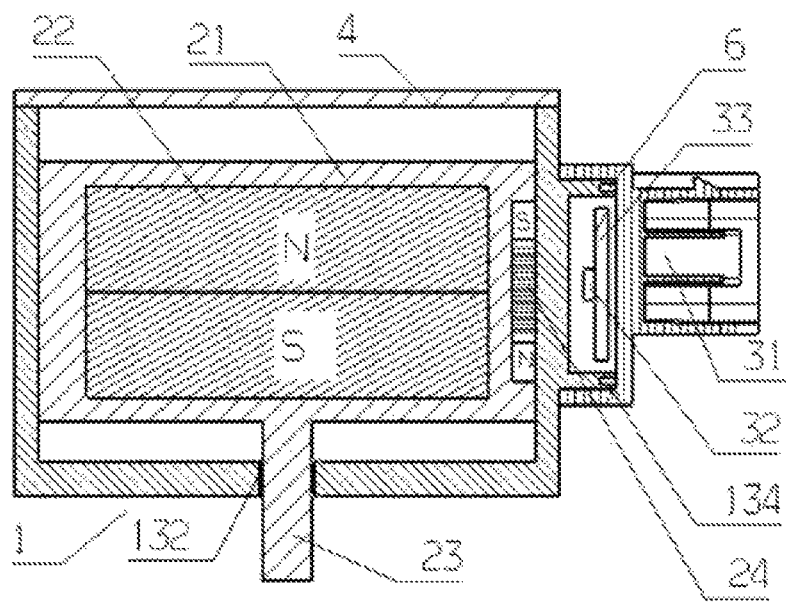
FIG. 7 shows a cross-sectional view of the actuator, along a plane A-A, according to the first embodiment of the present disclosure.

FIG. 7 shows a cross-sectional view of the brushless direct drive linear servo actuator, along a plane A-A, according to the first embodiment of the present disclosure, wherein the mover 2 can reciprocate along the direction of Z axis relative to the stator 1, and the housing 13 is opened with an output hole 132 at a site corresponding to the output end of the mover 2. The emitter 24 is provided at a side of the mover 2 facing the cover 3, the centre of which is arranged on the central plane 16 of mirror symmetry. When the mover 2 is in a central position of the stroke (the position as shown in the figure), the receiver 32 and the emitter 24 are arranged opposing each other.

For the above-described brushless direct drive linear servo actuator according to the first embodiment of the present disclosure, components of a magnetic field force between the mover 2 and the stator 1, perpendicular to the central plane 16 of mirror symmetry of the stator, have the same magnitude but opposite directions. As a result, theoretically the mover 2 does not bear any force perpendicular to the central plane 16 of mirror symmetry of the stator, but only pushing and pulling forces in a moving direction of the mover. Also, different from the general mechanically assembled structure of armature, mover and housing, where clearances accumulate and add up and thus result in an increased air gap variation between the mover and the stator. The armatures of the stator of the present disclosure are integrally encapsulated by the housing 13, and the resulting cavity 131 for mounting the mover is positioned and moulded relative to the stator pole shoe 102 by a mould, with a very high position accuracy; therefore, the mover 2 has little friction in the cavity 131 for mounting the mover, which greatly reduces abrasion of sliding surfaces, thereby improving the expected service life and reliability of a sliding system and meanwhile increasing the effective output of the system.

The emitter 24 is arranged on the central plane 16 of mirror symmetry, and the magnetic field generated here by the armatures of the stator and the magnet 22 of the mover has a magnetic-field component of nearly zero along the central plane 16 of mirror symmetry and perpendicular to the moving direction. When the receiver 32 detects with said magnetic field component, it is completely free of interferences of the magnetic field of the actuator. Meanwhile, the mover 2 performs a direct drive motion without any mechanical conversion clearance at all, which means that there is no deviation caused by mechanical conversion, thereby enabling a step-less position control at any position. A high accuracy of long-term operation of the actuator is thus guaranteed.

The stator 1 of the actuator is integrally encapsulated by the housing 13, and the heat generated by the coils, i.e. the wires 12, of the armatures of the stator can be conducted through the completely covering and integrally encapsulating housing 13, which significantly enhances the heat dissipating performance, and improves reliability and service life.

The stator of the actuator is integrally encapsulated by the housing 13, allowing components to be formed in high accuracy, and a concise and compact structure with a reduced total number of components. The actuator can be manufactured and assembled in a simple and reliable manner. In a limited stroke range, there is no need of a complicated electronic controller. The actuator can be controlled in the same manner as a common brushed actuator. Therefore, generally, the total production and usage cost is very. The present disclosure is especially suitable for large-scale manufacturing application field.

Figure 8:
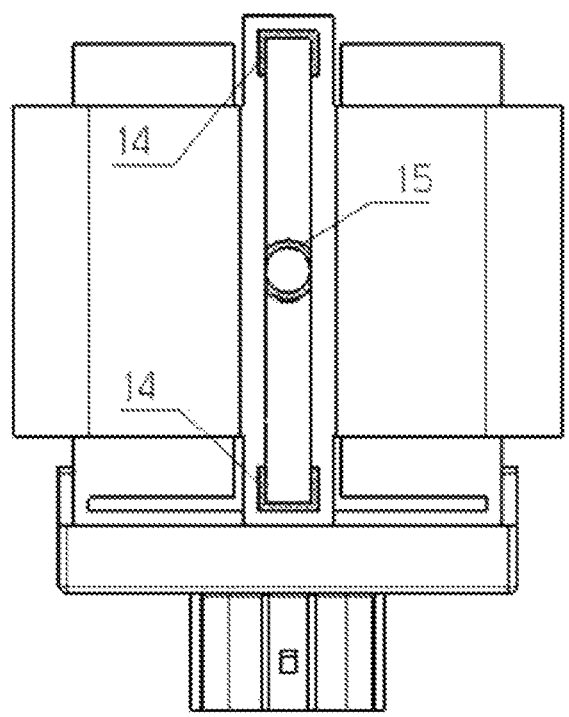
FIG. 8 shows a top view of an actuator according to a second embodiment of the present disclosure (with the cap and the mover omitted for clarity).

FIG. 8 shows a top view of a structure of a mover of a brushless direct drive linear servo actuator according to a second embodiment of the present disclosure (with the cover and mover omitted for clarity). The specific implementation is as follows: the second embodiment mainly differs from the first embodiment in that, bushings 14 are provided on side faces of the cavity 131 for mounting the mover of the housing 13, and an output end bushing 15 is arranged at an inner side of the output hole 132. The bushings 14 and 15 are made of a wear-resistant and load-resistant material, and such an arrangement further improves the load-resistant capacity and wear-resistant performance of the system, so as to further reduce the friction and improve the system reliability.

The skilled in the art may understand that, a structure of the bushing in the second embodiment may also be replaced with a sliding shaft. Specifically, at least one sliding shaft extends into the cavity 131 for mounting the mover, and the mover frame 21 is provided with shaft holes or grooves in the number and position corresponding to the sliding shafts, wherein the shaft holes or grooves are in sliding fit with the respective sliding shafts to guide the mover in the cavity 131 for mounting the mover. Further, the at least one sliding shaft includes a plurality of sliding shafts, more preferably two sliding shafts. Further, the sliding shaft is fixed to the housing 13. Further, under the configuration where two sliding shafts are provided, one shaft hole or groove, at a side of the mover frame 21, for example, a side close to the emitter 24, is a circular through-hole, which is in precise but loose fit with the respective sliding shaft, while the other shaft hole or groove is a waist-shaped hole or open waist-shaped hole in loose fit. Such a design can effectively solve the problems of interference or getting stuck between the mover 2 and the sliding shaft that are caused by a temperature-triggered expansion and contraction in a direction perpendicular to the moving direction.

Figure 9:
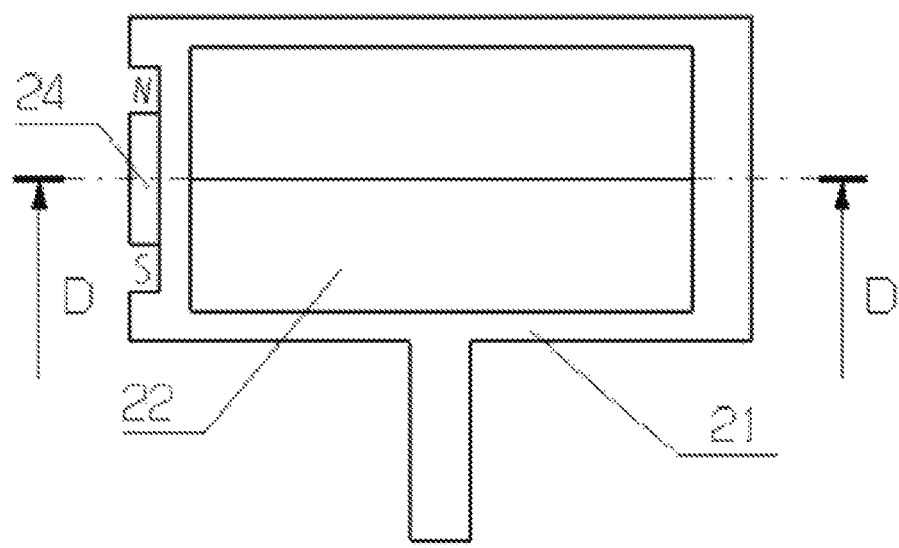
FIG. 9 shows a front view of a mover of an actuator according to a third embodiment of the present disclosure.
Figure 10:
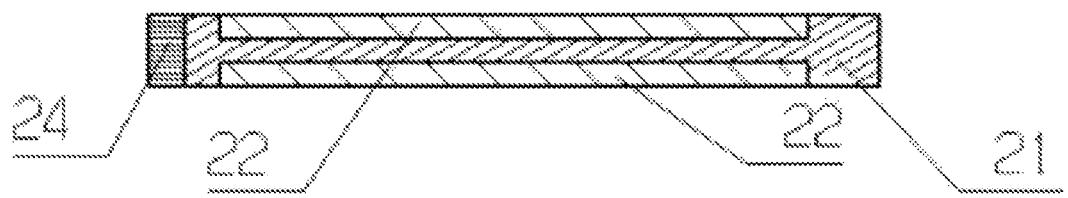
FIG. 10 shows a cross-sectional view of the mover of the actuator, along a plane D-D, according to the third embodiment of the present disclosure.

FIG. 9 and FIG. 10 respectively show a front view and a cross-sectional view, along a plane D-D, of a mover of an actuator according to a third embodiment of the present disclosure. The specific implementation is as follows: the general structure of the mover of the third embodiment of the present disclosure is similar to that of the first and second embodiments, while the differences lie in that, recesses are provided at the region for arranging magnets 22 on both sides of the mover frame 21, wherein the mover frame 21 is not through at the centre, and at least two pieces of magnets are adhered into the recesses on both sides of the mover frame 21 respectively so as to generate magnetic fields with N and S poles arranged alternatively. The recess region of the mover frame 21 is of a soft magnetic material. This arrangement not only significantly enhances the mechanical strength of the structure of the mover, but also effectively positions the magnets to guarantee the position accuracy of the components. Meanwhile the employed magnets are reduced in the necessary mechanical space, which reduces the cost.

Above described are only preferable embodiments of the present disclosure. The brushless direct drive linear servo actuator of the present disclosure is neither limited to the above embodiments, nor thereby limiting the patent scope of the present disclosure. Any structural derivation or transformation utilizing the description and the drawings of the present disclosure, and being applied directly or indirectly to other technical fields, as long as under the above described inventive concept, is within the patent protection scope of the present application.

The invention claimed is:

1. A brushless direct drive linear servo actuator, wherein the brushless direct drive linear servo actuator comprises a stator, a mover and a housing,
   wherein the stator is a pair of armatures arranged in mirror symmetry at both sides of the mover, the housing integrally encapsulates the stator and forms a cavity for the mover, and the mover has an output end protruding out of the housing and is linearly movable to a direction of the output end, and
   wherein the mover is slidable along an inner wall of the housing in the cavity for the mover, a position signal emitter is provided at a side of the mover in sliding contact with the housing, a cover is further provided outside the housing on said side, the housing is connected with the cover, a receiver paired with the position signal emitter is provided in the cover, and both the emitter and the receiver are positioned on a central plane of mirror symmetry of the armatures of the stator.

2. The brushless direct drive linear servo actuator according to claim 1, wherein the housing is connected with the cover in such a way that the housing and the cover are in a snap-fit connection.

3. The brushless direct drive linear servo actuator according to claim 2, wherein a seal groove is further provided at a connection region of the housing and the cover, and a seal is provided in the seal groove.

4. The brushless direct drive linear servo actuator according to claim 3, wherein the mover comprises a frame and magnets fixed within the frame, the output end is formed by protruding out of the frame, and the frame is slidable along the inner wall of the housing.

5. The brushless direct drive linear servo actuator according to claim 4, wherein a bushing is provided between the frame and a corresponding surface of the inner wall of the housing.

6. The brushless direct drive linear servo actuator according to claim 4, wherein a recess is provided on the frame, the magnet is positioned in the recess, and a recess region of the frame is of a soft magnetic material.

7. The brushless direct drive linear servo actuator according to claim 2, wherein the housing has a mounting opening at a side opposite to the output end, and a matching cap is provided on the mounting opening.

8. The brushless direct drive linear servo actuator according to claim 1, wherein a bushing is provided between the output end and the corresponding surface of the housing.

9. The brushless direct drive linear servo actuator according to claim 1, wherein the armature of the stator comprises an iron core having at least three stator poles and an insulation enclosing at least one of the stator poles, a wire coil is wound within the insulation, and the wire coils of the pair of armatures are connected end-to-end.

10. The brushless direct drive linear servo actuator according to claim 1, wherein the housing has a mounting opening at a side opposite to the output end, on which mounting opening a matching cap is provided.

11. The brushless direct drive linear servo actuator according to claim 1, wherein at least one sliding shaft extends into the cavity for the mover, and a frame of the mover is provided with a shaft hole or groove in the number and position corresponding to the sliding shaft, and wherein the shaft hole or groove is in sliding fit with the respective sliding shaft to guide the mover in the cavity for the mover.

12. The brushless direct drive linear servo actuator according to claim 11, wherein the at least one sliding shaft includes two sliding shafts.

13. The brushless direct drive linear servo actuator according to claim 12, wherein under a configuration where two sliding shafts are provided, one shaft hole or groove at a side of the frame of the mover is a circular through-hole, which is in precise but clearance fit with one of the sliding shafts.

14. The brushless direct drive linear servo actuator according to claim 12, wherein the two sliding shafts are fixed to the housing.

15. The brushless direct drive linear servo actuator according to claim 12, wherein under a configuration where the two sliding shafts are provided, one shaft hole or groove at a side of the frame of the mover is a circular through-hole, which is in precise but clearance fit with one of the two sliding shafts.

16. The brushless direct drive linear servo actuator according to claim 11, wherein the at least one sliding shaft is fixed to the housing.

17. The brushless direct drive linear servo actuator according to claim 16, wherein under a configuration where the at least one sliding shaft includes two sliding shafts, one shaft hole or groove at a side of the frame of the mover is a circular through-hole, which is in precise but clearance fit with one of the two sliding shafts.

18. The brushless direct drive linear servo actuator according to claim 1, wherein the housing has a mounting opening at a side opposite to the output end, and a matching cap is provided on the mounting opening.

19. The brushless direct drive linear servo actuator according to claim 1, wherein the housing has a mounting opening at a side opposite to the output end, and a matching cap is provided on the mounting opening.

* * * * *